United States Patent [19]

Struziak

[11] Patent Number: 5,547,286
[45] Date of Patent: Aug. 20, 1996

[54] HYDRODYNAMIC AIR THRUST BEARING WITH OFFSET BUMP FOILS

[75] Inventor: Ronald M. Struziak, Longmeadow, Mass.

[73] Assignee: United Technologies Corporation, Hartford, Conn.

[21] Appl. No.: 424,030

[22] Filed: Apr. 18, 1995

[51] Int. Cl.$^6$ ............................................. F16C 17/06
[52] U.S. Cl. ................................... 384/105; 384/106
[58] Field of Search ................................. 384/105, 106, 384/103, 122, 124

[56] References Cited

U.S. PATENT DOCUMENTS

| | | | |
|---|---|---|---|
| 4,621,930 | 11/1986 | Gu et al. | 384/105 |
| 5,110,220 | 5/1992 | Gu | 384/105 |
| 5,116,143 | 5/1992 | Saville et al. | 384/106 |
| 5,498,082 | 3/1996 | Nadjafi | 384/105 |

*Primary Examiner*—Lenard A. Footland
*Attorney, Agent, or Firm*—Norman Friedland

[57] ABSTRACT

The leading edges of the segmented corrugated springs of each of the two bump foils of a hydrodynamic thrust bearing are offset such that the leading edge in the upper segmented corrugated springs are circumferentially spaced relative to the leading edge of the lower segmented corrugated springs that is underlying each respective segment of the bump foils. In some embodiments the leading edge of the bump foil is attached and the trailing edge is free to move axially and in other embodiments the reverse occurs where the trailing edge of the bump foil is attached and the leading edge is free to move axially.

11 Claims, 2 Drawing Sheets

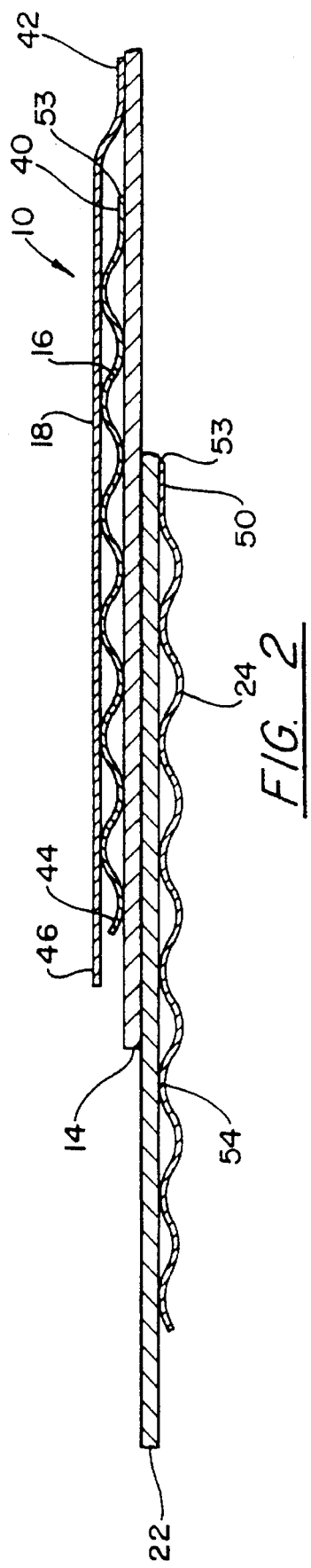
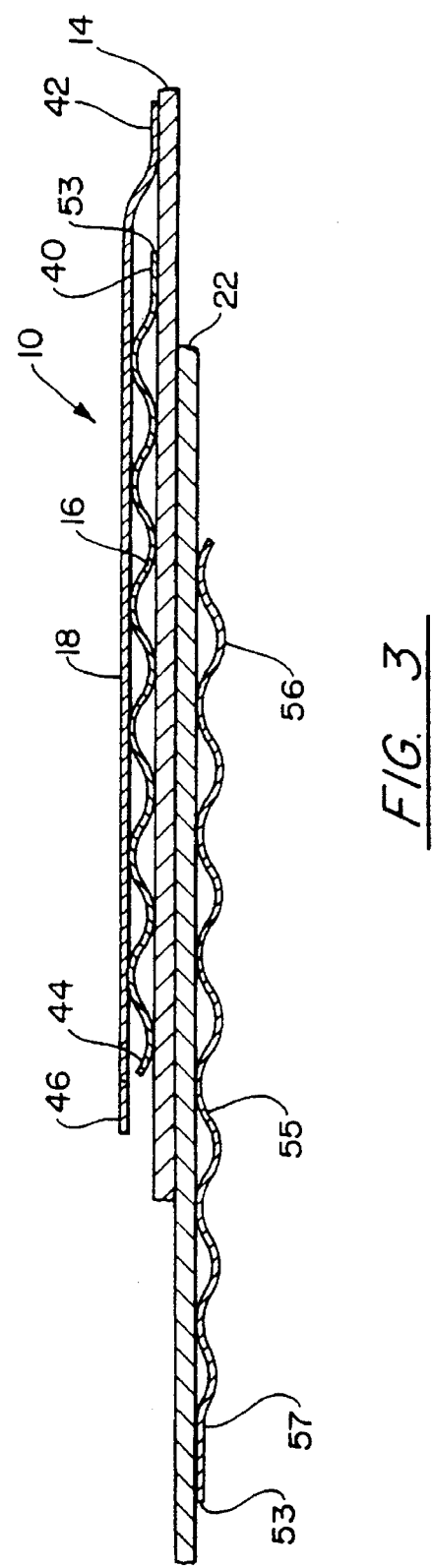

HYDRODYNAMIC AIR THRUST BEARING WITH OFFSET BUMP FOILS

CROSS REFERENCE

The subject matter of this patent application relates to the subject matter of U.S. patent application Ser. No. 08/424027 filed Apr. 18, 1995 by myself and entitled and commonly assigned to United Technologies Corporation, now U.S. Pat. No. 5,540,505.

TECHNICAL FIELD

This invention relates to hydrodynamic air thrust bearings and particularly to the relative orientation of the thrust bearing bump foils with respect to the backing spring bump foils.

BACKGROUND ART

As one skilled in this art appreciates, air foil bearings are extremely sophisticated and highly technical devices and alterations, changes and additions to the composition and configuration of these types of bearings are very critical and can materially affect the operation thereof. An example of a hydrodynamic fluid film thrust bearing is disclosed in U.S. Pat. No. 4,462,700 granted to G. L. Agrawal on Jul. 31, 1984 entitled "Hydrodynamic Fluid Film Thrust Bearing" and commonly assigned to United Technologies Corporation. This invention constitutes an improvement over the thrust bearing disclosed in this patent.

Typically, the thrust bearing includes a stationary thrust plate, a rotating thrust runner axially spaced therefrom, and one or two foils disposed therebetween. Each of the foils include backing members having different relative spring rates. In the thrust bearing that includes two foil corrugated backing members, the foil member adjacent to the rotating thrust runner typically is a corrugated metallic member with a relatively high spring rate which has a higher spring constant than the foil member adjacent the stationary thrust plate. This serves to establish and maintain an optimum fluid film geometry under all loading, speed and other operating conditions. The other backing member which has the lower relative spring constant provides the bearing with compliance for adequate load capacity and damping characteristics. It is to be understood that for certain applications it is beneficial to design both backing members to have equal spring rates to achieve particular performance parameters.

As is well known in this technology the surface of the washer shaped thrust bearing foil plate is fitted with a plurality of wedge shaped corrugated thrust bearing bump foils (segments) spaced about the circumference. The leading edge of the corrugated thrust bearing bump foils are welded to the face of the thrust bearing foil plate and the opposite end is unattached and free to move axially. The top foil which is similarly shaped to the corrugated thrust plate is likewise welded at the leading edge to the thrust bearing foil plate. The leading edge of the top foils is spaced just upstream of the leading edge of the corrugated thrust bearing bump foils. Depending on the particular application, the thrust bearing will consist of several of such segments and the number of segments utilized will principally depend on the optimized performance of such application.

To obtain damping the thrust bearing includes a second washer shaped backing spring foil plate and a plurality of corrugated backing spring bumper foils. Each of the corrugated backing spring bumper foils are identical in shape and size to each of the corrugated thrust bearing bump foils and their leading or trailing edges are welded to the face of the backing spring foil plate and the opposite end is unattached. The thrust bearing bump foil is attached to the upper face of the foil plate and the backing spring bump foil is attached to the lower face of its foil plate.

As is well known in this technology, the practice is to axially align the leading edges of the thrust bearing bump foil with the leading edges of the backing spring bump foil. Thus the leading edges and their respective weld joints of all the segments are in axial alignment with each other.

I have found that I can increase thrust bearing load capacity while at the same time reduce running torque by a significant amount by offsetting the leading edge of the thrust bearing bump foil relative to the leading edge of the backing spring bump foil. This improvement in the thrust bearing makes the difference in certain applications of meeting the thrust bearing requirements of certain rotating machinery.

SUMMARY OF THE INVENTION

An object of this invention is to provide an improved hydrodynamic air thrust bearing.

A feature of this invention is to provide for a hydrodynamic air thrust bearing a pair of bump foils that are offset relative to each other.

The foregoing and other features of the present invention will become more apparent from the following description and accompanying drawings.

BRIEF DESCRIPTION OF DRAWINGS

FIG. 2 is a partial sectional view taken through a segment of the overlying top foil, thrust bearing bump foil, thrust bearing foil plate and backing spring foil plate of FIG. 1; and FIG. 3 is a partial sectional view depicting another embodiment of the invention which is substantially the same as FIG. 2 except the weldment for attaching the bump foil to the lower plate is on the trailing edge rather than on the leading edge.

DETAILED DESCRIPTION OF THE PREFERRED EMBODIMENT

Figure 1:
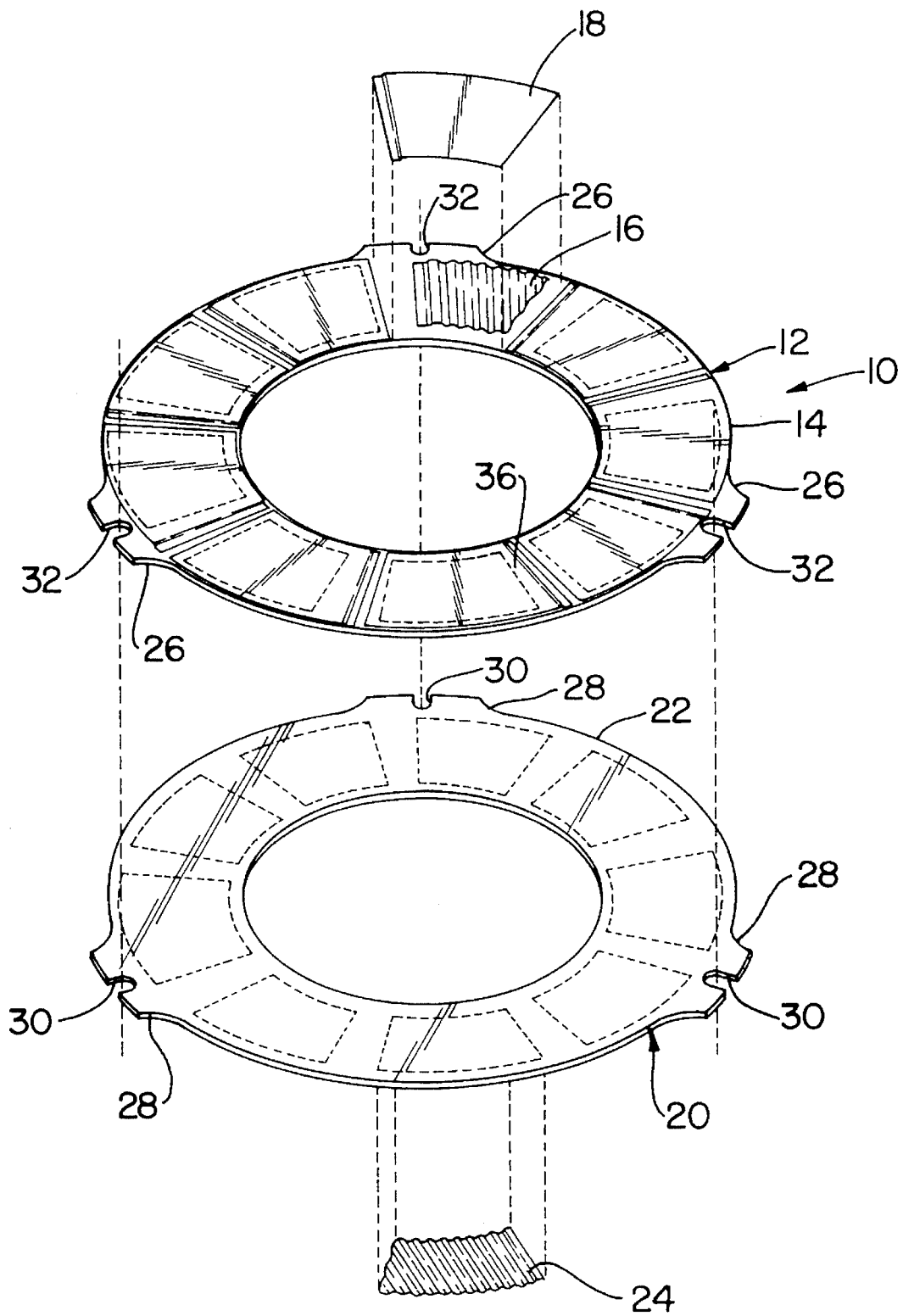
FIG. 1 is an exploded view in perspective illustrating the thrust bearing of this invention.

This invention is best understood by referring to FIGS. 1 and 2 wherein the thrust bearing generally illustrated by reference numeral 10 includes the top plate 12 consisting of foil plate 14, bump foils 16, and top foils 18 and the lower plate 20 consists of foil plate 22, and bump foils 24. As noted in FIG. 1, the foil plates 14 and 22 are toroidally shaped similar to a washer and include circumferentially spaced tangs 26 and 28 respectively, that include the central recess 32 and 30, respectively for attachment to the bearing support (not shown). A plurality of bump foils 16 and an equal number of the top foils 18 of the thrust bearing top plate 12 are circumferentially spaced and attached to the upper face 36 of foil plate 14. As noted in FIGS. 2 and 3, each of the bump foils 16 are fabricated from a metallic spring material and are corrugated with the corrugation oriented from the inner to outer diameter, i.e., radially, of the foil plate 14. The leading edge 40 of each of the bump foils are welded to support each of the truncated pie shaped wedge segments of the bump foils 16. The top foils 18 are similarly configured and likewise are fabricated from a high spring rate metallic material although they are not corrugated. The leading edge 42 of each of the top foils is also attached to the upper face of the top plate 14. The aft ends or trailing edges 44 and 46 of each of the bump foils 16 and top foils 18 are unattached and hence are free to move in the axial direction. As noted in FIG. 2, the leading edges 42 of the top foils 18 protrude beyond the leading edges 40 of the bump foils 16 in the circumferential direction.

The bump foils 24 are fabricated into a corrugated segment and are made from a spring metallic material whose spring rate is lower than or equal to the spring rate of the bump foils 16 and are likewise corrugated whose corrugations are similarly oriented. In FIG. 2 each of the leading edges 50 are welded to the under face of the lower plate 22. The welding is typically a spot weld process and the weldment are represented by reference numeral 53. As is the case of the bump foils 16 only the leading edge is secured and the aft or trailing edge 54 is free to move axially. For some applications, the design may be optimized (as noted in FIG. 3) by securing the trailing edge 57 of bump foil 55 by weldment 53 and the leading edge 56 is free to move axially. As is well known the bump foils provide the compliancy, bearing preload, load deflection and spring rate and the use of dual bump foils, as shown, provide the damping. For further details of the operation of this type of bearing reference should be made to U.S. Pat. No. 4,462,700, supra, which is incorporated herein by reference.

In accordance with this invention, the bump foils 16 and 24 are circumferentilaly offset such that the leading edges 40 of bump foils 16 and the leading edges 50 of bump foils 24 are circumferentilly spaced with respect to each other. This orientation of the leading edges of the bump foils serves to improve the compliancy characteristics of the thrust bearing and enhance the air wedge to improve air flow over the top foil.

It has been found that by actual tests, this offset bump foil arrangement provides assistance and compliance to the top foil leading edge 42 to form an improved air film to increase load capacity and reduce running torque.

Although this invention has been shown and described with respect to detailed embodiments thereof, it will be appreciated and understood by those skilled in the art that various changes in form and detail thereof may be made without departing from the spirit and scope of the claimed invention.

I claim:

1. A hydrodynamic fluid film thrust bearing comprising a toroidally shaped upper plate defining an upper surface, a plurality of resilient bump foil segments spaced circumferentially on said surface, each of said segments including a leading edge and means for attaching said leading edge to said upper plate, a plurality of top foils each having a leading edge circumferentially spaced on said surface and disposed in overlying relationship with said resilient bump foil segment, a toroidally shaped lower plate defining a lower surface, said toroidally shaped lower plate complementing and being space axially and disposed coaxially relative to said toroidally shaped upper plate, a plurality of other resilient bump foil segments circumferentially spaced on said lower surface and each other resilient bump foil segment having a leading edge, means for attaching said leading edge to said toroidally shaped lower plate, each of said resilient bump foil segments and each of said other resilient bump foil segments being in overlying relationship and said leading edges of each of said resilient bump foil segments and the leading edges of each of said other bump foil segments in overlying relationship being offset relative to each other.

2. A hydrodynamic fluid film thrust bearing as claimed in claim 1 wherein each of said resilient bump foil segments and each of said other resilient bump foil segments are shaped to define corrugations.

3. A hydrodynamic fluid film thrust bearing as claimed in claim 2 wherein the orientation of said corrugations are radially.

4. A hydrodynamic fluid film thrust bearing as claimed in claim 3 wherein said leading edges of said resilient bump foil segments are spot welded to said upper surface and said leading edges of said other resilient bump foil segments are spot welded to said lower surface.

5. A hydrodynamic fluid film thrust bearing as claimed in claim 4 wherein said segments of said resilient bump foil segments and said other resilient bump foil segments being truncated pie shaped wedges.

6. A hydrodynamic fluid film thrust bearing comprising a toroidally shaped upper plate defining an upper surface, a plurality of resilient bump foil segments spaced circumferentially on said surface, each of said segments including a leading edge and means for attaching said leading edge to said upper plate, a plurality of top foils each having a leading edge circumferentially spaced on said surface and disposed in overlying relationship with said resilient bump foil segment, A toroidally shaped lower plate defining a lower surface, said toroidally shaped lower plate complementing and being space axially and disposed coaxially relative to said toroidally shaped upper plate, a plurality of other resilient bump foil segments circumferentially spaced on said lower surface and each other resilient bump foil segment having a leading edge and a trailing edge, means for attaching said trailing edge to said toroidally shaped lower plate, each of said resilient bump foil segments and each of said other resilient bump foil segments being in overlying relationship and said leading edges of each of said resilient bump foil segments and the leading edges of each of said other bump foil segments in overlying relationship being offset relative to each other.

7. A hydrodynamic fluid film thrust bearing as claimed in claim 6 wherein each of said resilient bump foil segments and each of said other resilient bump foil segments are shaped to define corrugations.

8. A hydrodynamic fluid film thrust bearing as claimed in claim 7 wherein the orientation of said corrugations are radially.

9. A hydrodynamic fluid film thrust bearing as claimed in claim 8 wherein said leading edges of said resilient bump foil segments are spot welded to said upper surface and said trailing edges of said other resilient bump foil segments are spot welded to said lower surface.

10. A hydrodynamic fluid film thrust bearing as claimed in claim 9 wherein said segments of said resilient bump foil segments and said other resilient bump foil segments being truncated pie shaped wedges.

11. A hydrodynamic fluid film thrust bearing comprising a toroidally shaped upper plate defining an upper surface, a plurality of resilient bump foil segments spaced circumferentially on said surface, each of said bump foil segments including a leading edge and trailing edge, means for attaching said leading edge of said bump foil to said upper plate, a plurality of top foils each having a leading edge and a trailing edge circumferentially spaced on said surface and disposed in overlying relationship with said resilient bump foil segment, A toroidally shaped lower plate defining a lower surface, said toroidally shaped lower plate complementing and being space axially and disposed coaxially relative to said toroidally shaped upper plate, a plurality of other resilient bump foil segments circumferentially spaced on said lower surface and each other resilient bump foil segment having opposing edges, means for attaching one of said opposing edges to said toroidally shaped lower plate, each of said resilient bump foil segments and each of said other resilient bump foil segments being in overlying relationship and said leading edges of each of said resilient bump foil segments and the opposing edges of each of said other bump foil segments in overlying relationship being offset relative to each other.

* * * * *